2,696,261

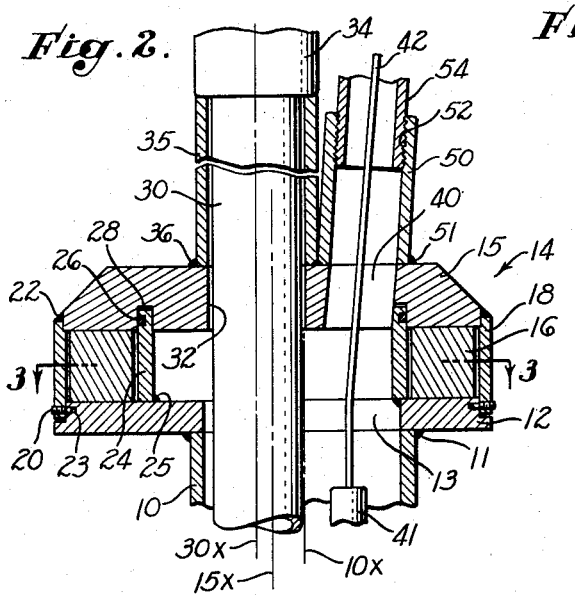
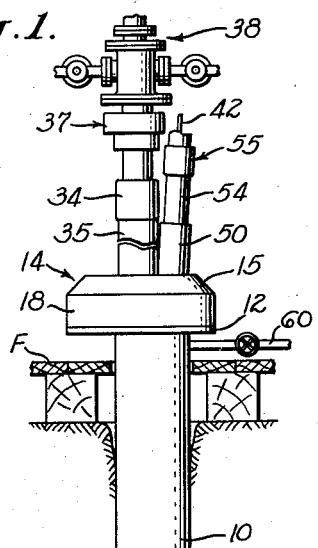
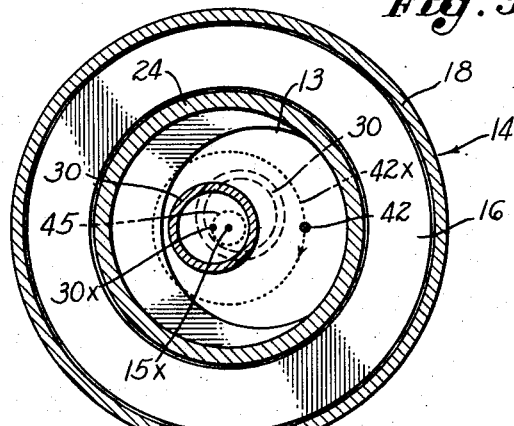
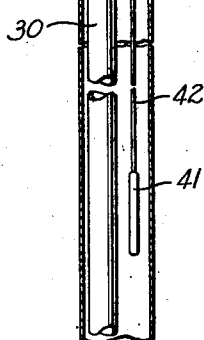
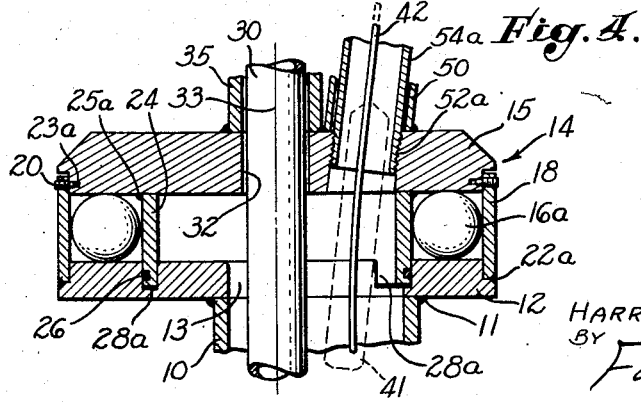
INVENTOR.
WILLIAM WALTER ENNIS
BY HIS ATTORNEYS.
HARRIS, KIECH, FOSTER & HARRIS United States Patent Office 2,696,261
Patented Dec. 7, 1954

ROTATING TUBING HEAD FOR INSTRUMENT RECOVERY

William Walter Ennis, Los Angeles, Calif., assignor, by mesne assignments, to Earle R. Atkins Application November 25, 1949, Serial No. 129,425

16 Claims. (Cl. 166—77)

This invention relates to well head structures adapted to be positioned upon the top of deep well casings and the like, the invention relating more particularly to structures adapted for satisfactorily running instruments and lines carrying the same into annular spaces between well casings and flow tubes positioned therein.

A particular object of the invention is to provide a head structure which will render relatively simple the withdrawal of a line and its instrument where the line has become twisted about the flow tubing inside the casing.

In the oil fields, instruments, such as thermometers and liquid level indicators, are frequently introduced into well casings and run down between the casings and flow tubing or similar tubing and withdrawn following the desired determinations. Often, such testings should be accomplished without interruption of flow or other well operation and without loss of gas pressure in the casing. Quite commonly the line on which an instrument is run wraps itself several times around the flow tubing, this presumably resulting from the weaving of the flow tubing from side to side with respect to the walls of the well casing. When the line is withdrawn, the twists remain and, apparently, ordinarily accumulate on the upper fifty to one hundred feet of the tubing. Sometimes it has been necessary to open the well to free the line and instrument, and, in the case of a flowing well, pressure is lost, the well has to be killed, and considerable expense and danger of blowout and fire are encountered. So far, devices by which solution of this problem has been attempted have failed.

I have discovered that untwisting of the instrument line may be effected as it is withdrawn from a well casing by causing the line at the point of its passage into the well head to rotate about the flow tubing in a direction to unwind the line from the flow tubing.

It is therefore a more particular object of this invention to provide a well head structure adapted for moving an instrument line being withdrawn from a well so that it may be readily caused to unwind itself from the flow tubing and thereby free the instrument for removal without complication.

Also, it is an object to provide in a well head structure a rotating tubing-carrying head provided with an opening or passage for introduction of any survey instrument and its line, whereby the opening receiving the line may be rotated at will about the axis of the flow tubing to unwind twists which are formed about the tubing during descent and ascent of the instrument.

Another object of the invention is so to position the mentioned rotating tubing head, which carries the tubing, that the tubing is offset with respect to the well casing, ample space being allowed between the tubing and the casing to receive any appropriate survey instrument and its line and to provide for the desired rotation of the instrument-receiving opening about the tubing position to untwist the line as above described.

Incidental twisting that occurs above the well head in eliminating twists about the flow tubing within the well is easily eliminated by the simple process of disconnecting the lead line outside the well, or disconnecting the polish rod, or making any other appropriate disconnection. Where an oil saver is used, such operations may be readily effected without removing the oil saver, especially if used for safety measures, or without otherwise materially affecting well operation.

Another object of the invention is so to relate the center of rotation of the rotating tubing head with respect to the center line of the tubing, as well as with respect to the center line of the well casing, that the tubing may, if necessary, have its position shifted with respect to the top of the casing in order the more readily to free the instrument for removal.

Other objects of the invention and the various features thereof will become apparent to those skilled in the art upon reference to the following specification and accompanying drawing wherein certain embodiments of the invention are illustrated.

In the drawing:

Fig. 1 is a somewhat diagrammatic illustration of a well equipped with the improvement of this invention;

Fig. 2 is a vertical section through the well head structure and the rotary tubing head of this invention;

Fig. 3 is a horizontal section taken on the line 3—3 of Fig. 2; and

Fig. 4 is a vertical section like that of Fig. 2 and illustrates certain modifications where the well head of this invention is employed with a well casing of somewhat greater size with respect to the flow tubing than in the arrangement of Fig. 2.

As illustrated in Figs. 1 and 2, a well casing 10 extends upward from within a well to the surface and above the usual derrick floor F where it is secured, as by the welding 11 illustrated, to a mounting member 12 having an offset opening 13 aligned with the casing bore. Rotatably mounted upon the mounting member 12 is a rotary tubing head, generally indicated at 14, which comprises a rotary head member 15 bearing upon appropriate means which, in the form of Fig. 2, is a bronze ring 16 resting upon the mounting member 12 and, in the form of Fig. 4, is a plurality of large steel balls 16a. The rotary head 14 is positioned upon the mounting member 12 through the medium of an annular guide ring 18 carrying adjacent one edge a plurality of guide screws 20. In the form of Fig. 2, the guide ring 18 is fixed, as by welding 22, to the rotary head member 15, the guide screws 20 being provided in the lower edge of the ring 18 and loosely received in an annular guide groove 23 in the periphery of the mounting member 12 where the lower portion of the guide ring 18 depends around an upper portion of the mounting member 12. In the form of Fig. 4, the mounting of the guide ring 18 is reversed, that is, the lower end of the guide ring 18 is welded at 22a to the mounting member 12, the upper end of the guide ring 18 carrying guide screws 20, and the guide groove 23a being provided in a peripheral portion of the rotary head member 15 nesting within the upper end of the guide ring 18.

For the purpose of packing off between the mounting member 12 and the rotary head member 15, an annular packing ring 24 is employed, the lower edge of this packing ring in the structure of Fig. 2 being sealed upon the mounting member 12 as by welding 25, its upper edge being packed in the rotary head member 15 through the medium of an annular packing ring element 26 carried in a corresponding groove in the outer face of such upper edge which projects upwardly into a downwardly directed packing groove 28 on the under side of the rotary head member 15. In the structure of Fig. 4, this arrangement is reversed, the upper edge of the packing ring 24 being fixed and sealed upon the rotary head member 15 by welding 25a and the lower edge thereof being received in a groove 28a in the upper face of the mounting member 12, where its outer lateral wall is engaged by the packing ring element 26 in the outer face of the lower edge of the packing ring 24. In each of the structures of Figs. 2 and 4 the rotary head member 15 is properly borne, guided, and packed by the bearings 16 or 16a, guide rings 18, and packing rings 24 and associated parts. In view of the offset relationship of the casing 10 of Fig. 4 with respect to the mounting member 12, the packing groove 28 cuts through the respective wall portion at the right side as indicated at 28b, without, however, interfering with the packing function of the packing ring element 26.

Depending within the casing 10 there is provided a flow tubing 30 positioned eccentrically in the casing 10 to the extent that it lies preferably at one side of the axis or center line of the casing 10 which is indicated in Fig. 2 as 10x. The tubing 30 is received in a tubing opening 32 in the rotary head member 15 adjacent its center which is the center of rotation of the rotary tubing head 14 and its member 15 and is indicated at 15x in the form of Fig. 2, where the center line or axis of the flow tubing 30 is slightly displaced, that is slightly eccentric, with respect to the center line 15x, such center line of the tubing 30 being indicated at 30x. In the form of Fig. 4, the center of rotation of the tubing head and the axis of the tubing 30 are coincident and are indicated at 33.

The flow tubing 30 is adapted to be supported upon the rotary head member 15 of the rotary tubing head 14, and, in the form illustrated, this is accomplished through the medium of a collar 34 on the tubing 30; this collar 34 bearing upon the upper end of a supporting sleeve 35 which is fixed and sealed, as by welding 36, upon the upper facing of the rotary head member 15. The upper end of the flow tubing 30 may be connected through an appropriate swivel joint 37 with a conventional "Christmas tree" 38, as shown in Fig. 1. Where the center of rotation of the rotary head 14 coincides with the axis of the tubing 30, as in Fig. 4, such swivel joint may have a coinciding axis which will not be disturbed upon rotation of the head 14.

The head member 15 is also provided with an instrument- and line-passing opening 40 spaced from the tubing opening 32, whereby to receive any type of survey or test instrument 41 with its supporting line 42. By reason of the rotary mounting of the head member 15, rotation thereof on its bearings 16 or 16a will cause the opening 40 and the line 42 therein to move around the flow tube 30, the path of the line 42 being in general indicated by the dotted circle 42x shown in Fig. 3, line 42, when in the position at the left of Figs. 2 and 4, riding over the upper edge of the mounting member 12 at its opening 13. Where the axis 30x of the flow tubing 30 is displaced slightly from the center of rotation 15x of the rotary head member 15, the axis 30x of the tubing 30 will move in a small dotted circle indicated at 45 in Fig. 3, as the head member 15 is rotated, one position of the tubing 30 during such rotation being indicated in broken lines. Of course, where the axes of the tubing 30 and the head member 15 are coincident, as in Fig. 4, the position of the tubing never changes.

For the purpose of introducing the instrument 41, on appropriate guide sleeve 50 is desirably sealed and fixed upon the upper face of the rotary head member 15, as by welding 51 (Fig. 2), for the mounting in the upper threaded end 52 thereof of a stem or so called "lubricator" 54 which may have at its upper end any appropriate union, coupling, or valve 55 whereby to retain pressure when desired or to pass the instrument 41 and its line 42 without substantial pressure loss in the case of flowing wells and the like. As shown in Fig. 4, the sleeve 50 may be simply a starting nipple with a stem or lubricator 54a positioned therein and threaded into the head member 15 at 52a. Any means may be provided for gas take-off from the casing 10, such as the valved line 60 indicated in Fig. 1.

From the foregoing description of the two forms of the apparatus shown, it is apparent that when an instrument 41 has been run into the casing 10 through the lubricator 54 and the opening 40, wraps in the line 42 around the tubing 30 which developed during the lowering of the instrument may be unwound as the line is withdrawn by correspondingly rotating the rotary head member 15 with any appropriate tool, the clearance between the tubing 30 and the opening 13 in the mounting member 12, as well as the upper portion of the casing 10, being always adequate for passage of the respective portion of the line 42. Twists in the line 42 which develop above the rotary tubing head around the tubing 35, or polish rod, or the like, may be easily eliminated subsequently by disconnecting the line or parts of the superstructure as may be necessary, or by manually unwinding the line 42 from its wrapped position around the superstructure. As a consequence, no lifting of any part of the well head is required, nor is it necessary to lift the flow tubing 30 or otherwise to disturb any portion of the well equipment, unless it be portions readily accessible or high in the supporting derrick. Even then, any such disconnections may be avoided after withdrawal of the instrument by manually moving the instrument, or the line, after detaching the instrument, around the superstructure to unwind the line.

Since variations of the generic invention herein disclosed will become apparent to those skilled in the art, it is intended to protect all modifications falling within the scope of the patent claims.

I claim as my invention:

1. In combination in a well head structure: a mounting member adapted to be mounted on the top of a well casing and having an opening to align with the bore of said casing for the passage of tubing and instruments through said opening into said casing; a rotary tubing head mounted in offset relation to the casing opening in said mounting member and having a tubing-receiving passage smaller than said casing opening; and bearing means rotatably mounting said tubing head on said mounting member with said tubing-receiving passage opposing a portion of said casing opening and eccentric to said casing opening, whereby tubing supported in said tubing-receiving passage depends eccentrically into said casing, said tubing head having a second passage spaced from said tubing-receiving passage and within said bearing means for passage of an instrument and a line therethrough into said casing, said second passage being rotatable in a path around said tubing-receiving passage as said head is rotated on said bearing means.

2. A combination as in claim 1 wherein said tubing-receiving passage is disposed adjacent the center of said head with its axis slightly eccentric to the center of rotation of said head whereby rotation of said head shifts the position of said tubing in said caisng.

3. A combination as in claim 1 wherein said tubing-receiving passage presents the center line of said tubing in coincidence with the center of rotation of said head and whereby rotation of said head to rotate said second passage leaves said tubing in its initial position with respect to the position of said tubing in said casing.

4. A combination as in claim 1 including means for supporting said tubing on said rotary head.

5. A combination as in claim 1 including a fitting mounted in said second passage for passage therethrough of said instrument and line.

6. A combination as in claim 1 including a lubricator fitting on said head at said second passage for introduction of said instrument and line without substantial pressure loss.

7. A combination comprising: a well casing; mounting means mounted upon said well casing in sealed relation to the top thereof, said mounting means having an opening therethrough aligned with the casing bore; a rotary tubing head mounted on said mounting means with its axis eccentric to the axis of said casing, said head having a tubing opening and an instrument and line opening therethrough, said tubing opening being smaller than said casing bore and being disposed eccentrically to said casing bore and overlying a portion thereof, and said instrument and line opening being spaced from said tubing opening and positioned for passage of said instrument and line into said casing; tubing supported on said head at said tubing opening and depending into said casing; and bearing means rotatably mounting said head on said mounting means, whereby said instrument line opening may be rotated about said tubing and its opening.

8. A combination as in claim 7 wherein the axis of said tubing coincides with the center of rotation of said bearing means.

9. A combination as in claim 7 wherein the axis of said tubing is offset with respect to the axis of rotation of said head, whereby rotation of said head shifts the position of said tubing in said casing.

10. A combination as in claim 7 wherein said tubing opening is located approximately centrally of said head.

11. A combination as in claim 7 including a fitting carried by said head in communication with said instrument and line opening to pass said instrument and line therethrough.

12. A combination as in claim 7 including a closure fitting mounted on said head in sealing relation with said instrument and line opening and adapted to pass said instrument and line with minimum loss of pressure from said well casing.

13. A rotary tubing head for oil wells comprising in combination: a mounting member having an opening adapted for registration with the bore of a well casing; a rotary head member rotatable on said mounting member; and bearing means rotatably mounting said rotary head member on said mounting member, said head member having a first aperture therein of smaller diameter than said casing and opening to receive and suspend therefrom a flow tubing hanging in said casing, said head member also having a second aperture therein spaced from said first aperture for passage of an instrument and its supporting line into said opening and casing in the annulus between said tubing and casing.

14. A combination as in claim 13 wherein said first aperture is eccentric to said opening and casing.

15. A combination as in claim 13 wherein the center of rotation of said bearing means is eccentric to said casing and opening.

16. In combination in a well head structure: a mounting member adapted to be mounted on the top of a well casing and having an opening to align with the bore of said casing for the passage of tubing and instruments through said opening into said casing; a rotary tubing head mounting in off-set relation to the casing opening in said mounting member and having a tubing-receiving passage smaller than said casing opening; and bearing means rotatably mounting said tubing head on said mounting member with said tubing-receiving passage opposing a portion of said casing opening and eccentric to said casing opening, whereby tubing supported in said tubing-receiving passage depends eccentrically into said casing, means for supporting said tubing on said rotary head, said tubing head having a second passage spaced from said tubing-receiving passage and within said bearing means for passage of an instrument and a line therethrough into said casing, said second passage being rotatable in a path around said tubing-receiving passage as said head is rotated on said bearing means.

References Cited in the file of this patent

UNITED STATES PATENTS

| Number | Name | Date |
|---|---|---|
| 1,503,476 | Childs et al. | Aug. 5, 1924 |
| 2,168,591 | Tschappat | Aug. 8, 1939 |
| 2,179,814 | Conaghan | Nov. 14, 1939 |